US008731570B2

(12) United States Patent
Yamaguchi et al.

(10) Patent No.: US 8,731,570 B2
(45) Date of Patent: May 20, 2014

(54) METHOD AND APPARATUS FOR ALLOCATING CONNECTION IDENTIFIER IN WIRELESS COMMUNICATION SYSTEM

(75) Inventors: Kazuhiko Yamaguchi, Kawasaki (JP); Michiko Anbe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 515 days.

(21) Appl. No.: 12/256,847

(22) Filed: Oct. 23, 2008

(65) Prior Publication Data

US 2009/0111479 A1   Apr. 30, 2009

(30) Foreign Application Priority Data

Oct. 31, 2007   (JP) .................................. 2007-284545

(51) Int. Cl.
*H04W 72/00*   (2009.01)
(52) U.S. Cl.
USPC ........... 455/450; 370/329; 370/330; 370/341; 455/452.1
(58) Field of Classification Search
USPC ....................................................... 455/450
See application file for complete search history.

(56) References Cited

U.S. PATENT DOCUMENTS

| | | | | |
|---|---|---|---|---|
| 7,751,363 | B1* | 7/2010 | Etemad et al. | 370/329 |
| 7,974,312 | B2* | 7/2011 | Ahmadi et al. | 370/477 |
| 2005/0058058 | A1* | 3/2005 | Cho et al. | 370/208 |
| 2005/0107036 | A1* | 5/2005 | Song et al. | 455/23 |
| 2005/0201269 | A1 | 9/2005 | Shim et al. | |
| 2006/0056341 | A1 | 3/2006 | Takagi et al. | |
| 2007/0032255 | A1 | 2/2007 | Koo et al. | |
| 2007/0153698 | A1* | 7/2007 | Lee et al. | 370/235 |
| 2007/0258407 | A1* | 11/2007 | Li et al. | 370/331 |
| 2009/0046637 | A1* | 2/2009 | Kim et al. | 370/329 |
| 2009/0092076 | A1* | 4/2009 | Zheng et al. | 370/328 |
| 2009/0298504 | A1* | 12/2009 | Lee et al. | 455/437 |

FOREIGN PATENT DOCUMENTS

| | | |
|---|---|---|
| JP | 2001-53675 | 2/2001 |
| JP | 2006-526308 | 11/2006 |
| WO | WO 2006/085732 A1 | 8/2006 |
| WO | WO 2007/019672 A1 | 2/2007 |

OTHER PUBLICATIONS

European Search Report issued May 7, 2013 for corresponding application No. 08167671.0, 9 pages.
IEEE Standard for Local and Metropolitan Area Networks "Part 16: Air Interface for Fixed and Mobile Broadband Wireless Access Systems" 2006, pp. 1, 502-513, 671-677, 707.

* cited by examiner

*Primary Examiner* — Liton Miah
(74) *Attorney, Agent, or Firm* — Staas & Halsey LLP

(57) ABSTRACT

An apparatus for allocating one or more connection identifiers in a base station of a wireless communication system is used in a base station. The base station has a function of allocating one or more connection identifiers used for specific call communication between the base station and a mobile station. The apparatus includes a unit for defining one or more connection identifiers used for the specific call communication and one or more burst profiles that are attributes related to wireless communication using the one or more connection identifiers. Also included is a unit for broadcasting the one or more connection identifiers used for the specific call communication and the one or more burst profiles to the mobile station.

3 Claims, 15 Drawing Sheets

FIG. 4

| SYNTAX | SIZE (BITS) | VALUE (EXAMPLE) | NOTE |
|---|---|---|---|
| UL_MAP_IE(){ | | | |
| CID | 16 | 0XEA60 | 0XEA60: 60,000 |
| UIUC | 4 | 0X04 | RELATIONSHIP BETWEEN UIUC AND BURST PROFILE IS DEFINED IN UCD (ACCORDING TO STANDARD) |
| DURATION | 10 | | |
| REPETITION CODING INDICATION | 2 | | |
| } | | | |

FIG. 5A

| | FRAME NUMBER | BS | | MS | REMARKS | ELAPSED TIME |
|---|---|---|---|---|---|---|
| TRANSPORT CONNECTION ALLOCATION PROCEDURE | 0 | DSA-REQ, DSA-REQ | → | | SIMULTANEOUS UPLINK/DOWNLINK (PACKING) | 0 |
| | 2 | | ← | BW.RNG CODE | | 10ms |
| | 5 | CDMA IE | → | | | 25ms |
| | 6 | | ← | SIGNALING HEADER (BW REQ) | | 30ms |
| | 9 | OFDMAUL-MAP IE | → | | | 45ms |
| | 10 | | ← | DSA-RES | | 50ms |
| | 10 | | ← | DSA-RES | | 50ms |
| | 13 | DSA-ACK, DSA-ACK | → | | SIMULTANEOUS UPLINK/DOWNLINK (PACKING) | 65ms |

FIG. 5B

| | FRAME NUMBER | BS | | MS | REMARKS | ELAPSED TIME |
|---|---|---|---|---|---|---|
| BANDWIDTH ALLOCATION PROCEDURE | 0 | | ← | BW.RNG CODE | | 0 |
| | 1 | CDMA IE | → | | | 5ms |
| | 4 | | ← | SIGNALING HEADER (BW REQ) | | 20ms |
| | 5 | OFDMAUL-MAP IE | → | | | 25ms |
| | 8 | | ← | PING(REQ) | | 40ms |

FIG. 7

|  | CID | IN USE |
|---|---|---|
| ALLOCATION AS EMERGENCY CALL CID | 0X07D1 | × |
|  | 0X07D2 | × |
|  | 0X07D3 | × |
|  | 0X07D4 |  |
|  | 0X07D5 |  |
|  |  |  |
| ALLOCATION AS NORMAL CID | 0X07D6 | × |
|  | 0X07D7 | × |
|  | 0X07D8 | × |
|  | 0X07D9 | × |
|  | 0X07D10 | × |
|  | 0X07D11 | × |
|  | 0X07D12 | × |

FIG. 8

| SYNTAX | SIZE(BITS) | VALUE (EXAMPLE) | NOTE |
|---|---|---|---|
| UL_MAP_IE(){ | | - | |
| CID | 16 | 0XEA60 | |
| UIUC | 4 | 0X0B | 0X0B:EXTENDED-2 UIUC |
| UL_EXTENDED-2_IE(){ | | | |
| EXTENDED-2 UIUC | 4 | 0X09 | 0X09: RESERVED RELATIONSHIP BETWEEN EXTENDED2-UIUC AND BURST PROFILE IS DEFINED IN UCD (ACCORDING TO STANDARD) |
| LENGTH | 8 | 0X01 | 1 BYTE |
| CID STATUS | 8 | 0X01 | 0X00: UNUSED<br>0X01: IN USE<br>(PART DEFINED AS UNSPECIFIED DATA IN MATERIAL 2 IS DEFINED AS THE ABOVE AND USED IN THE PRESENT INVENTION) |
| } | | | |
| } | | | |

FIG. 13

| SYNTAX | SIZE (BITS) | VALUE (EXAMPLE) | NOTE |
|---|---|---|---|
| UL_MAP_IE(){ | | - | |
| CID | 16 | 0XEA60 | |
| UIUC | 4 | 0X0B | 0X0B:EXTENDED-2 UIUC |
| UL_EXTENDED-2_IE(){ | | | |
| EXTENDED-2 UIUC | 4 | 0X09 | 0X09: RESERVED<br>RELATIONSHIP BETWEEN EXTENDED2-UIUC AND BURST PROFILE IS DEFINED IN UCD (ACCORDING TO STANDARD) |
| Length | 8 | 0X01 | 1 BYTE |
| CID STATUS | 4 | 0X01 | 0X00: UNUSED<br>0X01: IN USE<br>(PART DEFINED AS UNSPECIFIED DATA IN MATERIAL 2 IS DEFINED AS THE ABOVE AND USED IN THE PRESENT INVENTION) |
| PERIOD | 4 | 0X02 | 0X00: RESERVED<br>0X01: ONCE PER FRAME<br>0X02: ONCE PER TWO FRAMES<br>(PART DEFINED AS UNSPECIFIED DATA IN MATERIAL 2 IS DEFINED AS THE ABOVE AND USED IN THE PRESENT INVENTION) |
| } | | | |
| } | | | |

METHOD AND APPARATUS FOR ALLOCATING CONNECTION IDENTIFIER IN WIRELESS COMMUNICATION SYSTEM

CROSS-REFERENCE TO RELATED APPLICATIONS

The present invention claims priority to Japanese Patent Application No. JP 2007-284545, filed Oct. 31, 2007, which is incorporated in its entirety by reference herein.

BACKGROUND OF THE INVENTION

1. Field of the Invention

The embodiments discussed herein are directed to a method and apparatus for allocating a connection identifier (CID) in a wireless communication system, such as a WiMAX system, and particularly to a technique for allocating a CID for reducing time until the establishment of call connection.

2. Description of the Related Art

WiMAX (Worldwide Interoperability for Microwave Access) is a communication connection standard. WiMAX is used for the so-called last one mile and the like in an area where the laying of a broadband line is difficult. WiMAX is also a standard of a wireless communication technology that is expected to be used as a communication connection standard for high speed mobile communication. WiMAX is intended for wireless communication covering a medium and long distance area in a range of several km to several tens of km. WiMAX is technology that forms a MAN (Metropolitan Area Network) exceeding a LAN (local area network).

The standardization of WiMAX is promoted by the IEEE 802.16 Working Group and WiMAX Forum, an industry organization, to ensure interconnectivity between different equipment.

In the WiMAX standard, BS connection management part 1401-2 in BS 1401 and MS connection management part 1402-2 in MS 1402 execute a communication connection establishment control operation, as shown in FIG. 14, while the BS transmission and reception part 1401-1 in the base station (hereinafter referred to as "BS") 1401 and the MS transmission and reception part 1402-1 in the mobile station (hereinafter referred to as "MS") 1402, which is a portable terminal, perform wireless communication.

At this time, BS 1401 and MS 1402 exchange and determine an identifier called a connection identifier (hereinafter referred to as "CID") with each other. BS 1401 and MS 1402 also perform user data communication using this determined CID.

FIG. 15 is an operation sequence diagram showing procedures until a CID is allocated and user data flows between BS 1401 and MS 1402 shown in FIG. 14 in the WiMAX standard.

First, the channel scan procedure of operation S1501 is carried out. In this procedure, the operations of downstream channel complement and synchronization establishment are executed. MS connection management part 1402-2 searches for WiMAX wireless signals from BS 1401 and receives messages of DCD (Downlink Channel Descriptor), UCD (Uplink Channel Descriptor), DL-MAP (Downlink Map), and UL-MAP (Uplink Map), in which information on the channel is written, according to this procedure.

Next, the initial ranging procedure of operation S1502 is carried out. In this procedure, first, MS 1402 sends a ranging code message to BS 1401. In response to this, timing adjustment information, output adjustment information, frequency adjustment information, and the like are transmitted from BS 1401 to MS 1402 in order that BS 1401 continuously receives a signal from MS 1402. Next, MS 1402 sends a RNG-REQ message to BS 1401. In response to this, BS connection management part 1401-2 allocates to MS 1402 a basic connection ID (hereinafter referred to as "basic CID") and a primary connection ID (hereinafter referred to as "primary CID"). The basic connection ID and the primary connection ID are used for the subsequent message exchange, using a RNG-RSP message. The BS connection management part 1401-2 simultaneously records these CIDs in a connection identifier database (hereinafter referred to as "CID-DB") 1401-3 (FIG. 14). After this, message exchange between BS 1401 and MS 1402 is carried out using a fixed CID in each procedure until the transport connection establishment procedure of operation S1505. The fixed CID is the above-described basic CID or primary CID.

Next, the basic capability procedure of operation S1503 is carried out. In this procedure, MS connection management part 1402-2 transmits the basic function of MS 1402 to BS 1401, using a SBC-REQ message. Then, BS connection management part 1401-2 transmits a function common to BS 1401 and MS 1402 to MS 1402, using a SBC-RSP message.

Subsequently, the authentication/encryption procedure of operation S1504 is carried out. In this procedure, a control operation in which BS 1401 authenticates MS 1402 is carried out. Specifically, MS connection management part 1402-2 transmits an authentication request to BS 1401 using an AuthRequest message. In response to this, BS connection management part 1401-2 carries out the authentication of MS 1402. If the authentication is successful, BS connection management part 1401-2 transmits an authentication key to MS 1402, using an AuthReply message.

Next, the registration procedure of operation S1505 is carried out. In this procedure, network parameters are determined between BS 1401 and MS 1402 using a REG-REQ message that is transmitted from MS connection management part 1402-2 to BS 1401, and a REG-RSP message that is transmitted, in response to this, from BS connection management part 1401-2 to MS 1402.

Subsequently, the transport connection procedure of operation S1506 is carried out. In this procedure, MS connection management part 1402-2 or BS connection management part 1401-2 requests of MS 1402 or BS 1401 the setting of a service flow. The service flow setting is a pass for performing data communication using a DSA-REQ message. The BS connection management part 1401-2 or MS connection management part 1402-2 that receives the DSA-REQ message responds using a DSA-RSP message and establishes a service flow. At this time, BS connection management part 1401-2 selects an unused CID by performing an inquiry to CID-DB 1401-3. The BS connection management part 1401-2 then transmits the CID as a transport connection ID (hereinafter referred to as "transport CID") for user data transfer, with service flow parameters, to MS 1402, using a DSA-RSP message. Also, BS connection management part 1401-2 records information on the allocation of the transport CID in CID-DB 1401-3.

When MS 1402 first starts data transmission using this transport CID, the bandwidth allocation procedure of operation S1507 is carried out. In this procedure, a request for the allocation of a bandwidth for data transmission is performed by MS 1402 to BS 1401. MS connection management part 1402-2 performs bandwidth ranging and requests of BS 1401 the allocation of a bandwidth for transmitting a bandwidth request message for notifying a necessary bandwidth. By reflecting the result of this request in a UL-MAP message, BS connection management part 1401-2 allocates to MS 1402 a bandwidth for transmitting a bandwidth request message. By transmitting a bandwidth request message using this allocated bandwidth, MS connection management part 1402-2 performs a request for a bandwidth necessary for the upstream line to BS 1401. BS connection management part 1401-2 transmits the result of this request to MS 1402, using an UL-MAP message.

Subsequently, MS 1402 transmits and receives user data to and from BS 1401 using the transport CID. Upstream user data from MS 1402 to BS 1401 is transmitted using a bandwidth determined by the above-described UL-MAP message.

In this manner, in the conventional WiMAX standard, user data communication is started with many procedures as described above. In urgent communication, on the other hand, such as an emergency call, there is a strong desire to omit sequences as much as possible to reduce time until connection and to start communication immediately.

Also, the Ministry of Land, Infrastructure and Transport, and the National Police Agency promote ITS (Intelligent Transport Systems) in which road traffic problems, such as a traffic accident jam, are solved by networking people, roads, and vehicles with information using leading-edge information communication technology. When WiMAX wireless communication is applied to the communication technology for ITS, BS-MS communication should be performed within a limited service area and for a short time because the moving speed of a vehicle in which an MS is mounted is fast. Particularly, information on safety (the notification of the risk of an intersection accident, and the like) should be instantaneously transmitted.

However, in the above-described conventional art, a CID is determined on the BS side and transmitted to the MS, so that time is required for the exchange.

A technique described in Japanese Laid-Open Patent Publication No. 2006-526308 is a technique in which a BS broadcasts uplink channel information (UL-MAP) including one or more CIDs to an MS. The MS selects a CID randomly for a connection request and transmits a connection request message to the BS. But, this technique is not a technique for selecting a transport CID for user data transmission.

Also, a technique described in Japanese Laid-Open Patent Publication No. 2001-53675 is a technique in which a BS allocates and transmits an unused CID for user data transmission to an MS. But, in this technique, the BS performs allocation determination, so that time for notifying the allocated CID from the BS to the MS is required.

SUMMARY OF THE INVENTION

According to an aspect of embodiments, an apparatus for allocating one or more connection identifiers in a base station of a wireless communication system, the apparatus being used in a base station that has a function of allocating one or more connection identifiers used for specific call communication between the base station and a mobile station, the apparatus includes a unit for defining one or more connection identifiers used for the specific call communication and one or more burst profiles that are attributes related to wireless communication using the one or more connection identifiers. Also included is a unit for broadcasting the one or more connection identifiers used for the specific call communication and the one or more burst profiles to the mobile station.

The above-described embodiments of the present invention are intended as examples, and all embodiments of the present invention are not limited to including the features described above.

BRIEF DESCRIPTION OF THE DRAWINGS

FIG. 4 is a diagram of the UL-MAP message format of the first embodiment;

FIGS. 5A and 5B are diagrams explaining the effect of the first embodiment;

FIG. 7 is a diagram explaining the operation of the second embodiment;

FIG. 8 is a diagram of the UL-MAP message format of the second embodiment;

FIG. 13 is a diagram of the UL-MAP message format of the fifth embodiment;

DETAILED DESCRIPTION OF THE PREFERRED EMBODIMENTS

Figure 1:
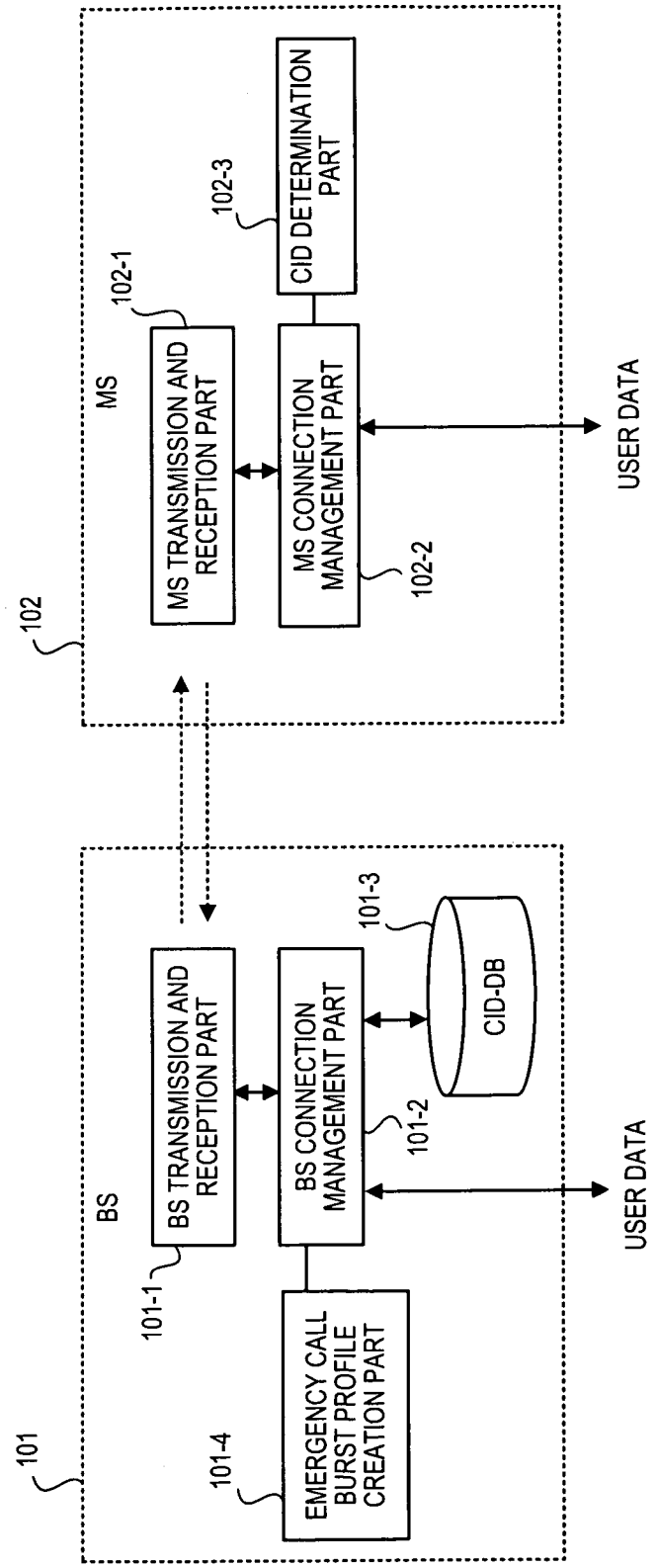
FIG. 1 is a configuration diagram of first and second embodiments.

Reference may now be made in detail to embodiments of the present invention, examples of which are illustrated in the accompanying drawings, wherein like reference numerals refer to like elements throughout.

Embodiments will be described below in detail with reference to the drawings.

First Embodiment

FIG. 1 is a configuration diagram of a first embodiment.

Base station (hereinafter referred to as "BS") 101 constitutes a base station of a WiMAX wireless communication system. BS 101 comprises a base station transmission and reception part (hereinafter referred to as "BS transmission and reception part") 101-1, a base station connection management part (hereinafter referred to as "BS connection management part") 101-2, a connection ID database (hereinafter referred to as "CID-DB") 101-3, and an emergency call burst profile creation part 101-4.

MS 102 constitutes a mobile station of the WiMAX wireless communication system. MS 102 comprises a mobile station transmission and reception part (hereinafter referred to as "MS transmission and reception part") 102-1, a mobile station connection management part (hereinafter referred to as "MS connection management part") 102-2, and a connection identifier determination part (hereinafter referred to as "CID determination part") 102-3.

In the first embodiment, emergency call burst profile creation part 101-4 in BS 101 can determine burst profiles and emergency call CIDs. Burst profiles are areas where MS 102 can randomly determine and use a transport CID. The emergency call burst profile creation part 101-4 can transmit them to the MS 102 side via BS connection management part 101-2 and BS transmission and reception part 101-1.

Figure 2:
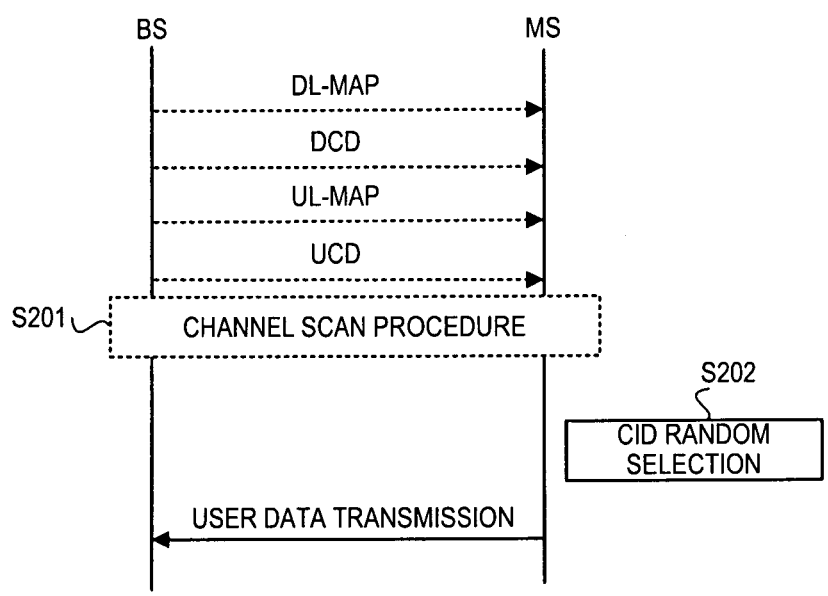
FIG. 2 is an operation sequence diagram of the first embodiment.
Figure 3:
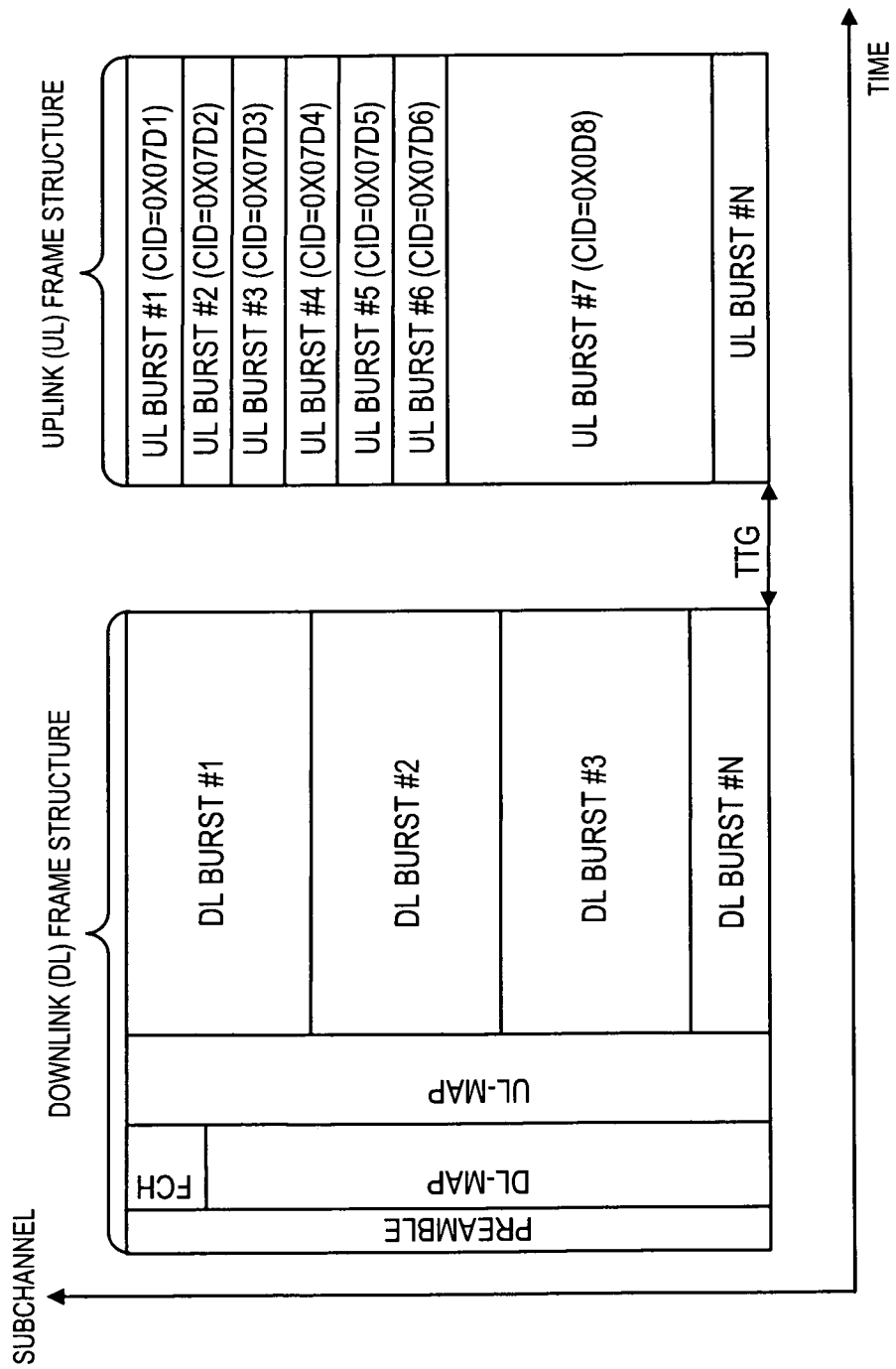
FIG. 3 is a diagram of the WiMAX frame structure of the first embodiment.

FIG. 2 is an operation sequence diagram of the first embodiment, and FIG. 3 is a diagram showing frame structures in accordance with the WiMAX standard in the first embodiment.

In the first embodiment, the parts (#1 to #5) of an uplink (UL) frame shown in FIG. 3 are used for an emergency call. Other parts (#6 to #n) are used for user data transmission and reception in accordance with a general WiMAX standard. In other words, the first embodiment can coexist with conventional WiMAX wireless communication.

BS connection management part 101-2 in FIG. 1 writes a burst profile in a UL-MAP message and transmits it to the MS 102 side via BS transmission and reception part 101-1, as a channel scan procedure shown by operation S201 in FIG. 2. The burst profile comprises parameters such as the uplink (UL) frame structure in FIG. 3, the modulation scheme of each burst, and a coding rate. Also, BS connection management part 101-2 writes a CID used at this time in CID-DB 101-3.

MS connection management part 102-2 in FIG. 1, with timing shown by operation S202 in FIG. 2, allows CID determination part 102-3 in FIG. 1 to randomly determine a transport CID used for user data transmission from among one or more CIDs transmitted by the UL-MAP message that is received via MS transmission and reception part 102-1. The MS connection management part 102-2 starts transmission by the user using the determined CID.

FIG. 4 is a diagram showing the data format of the UL-MAP message (UL_MAP_IE: uplink map information element) in the frame structure in FIG. 3 in the first embodiment.

CIDs that are already assigned in WiMAX wireless communication are written in the UL-MAP message, also in a normal WiMAX standard. In the first embodiment, emergency call UL burst CIDs are also similarly transmitted by the UL-MAP message.

However, when emergency call UL burst CIDs coexist with CID notification in the normal WiMAX standard, emergency call CIDs are set to, for example, numbers 60,000 and greater so that MS 102 does not erroneously select a CID used in the normal WiMAX standard. CID determination part 102-3 in FIG. 1 randomly selects from among CIDs of numbers 60,000 and greater among CIDs transmitted by the UL-MAP message. This arrangement can be optionally determined between BS 101 and MS 102.

In the first embodiment, the UL-MAP format shown in FIG. 4 that is defined as the WiMAX standard is utilized as it is. In the standard, CIDs that are dynamically allocated in response to an allocation request are written in the UL-MAP, but in the first embodiment, emergency call CIDs that are determined by emergency call burst profile creation part 101-4 and BS connection management part 101-2 in FIG. 1 are fixedly written.

In the first embodiment, a plurality of MSs 102 each randomly select from one or more CIDs broadcast from BS 101, so that CID contention may occur among the plurality of MSs 102.

For example, when contention occurs between two MSs 102, two cases can occur. The two cases are case 1: the possibility that BS 101 receives the signal of either MS 102, or case 2: the possibility that BS 101 receives the signals of both MSs 102 and cannot demodulate the data of either MS 102.

BS 101 passes the packet to a relay process in case 1 and discards the packets in case 2. The operation after discard depends on whether a retransmission procedure is supported or not. When a retransmission procedure, such as ARQ and HARQ, is supported, BS 101 and MSs 102 operate according to the procedure. When the retransmission procedure is not supported, BS 101 simply discards the received packets, and the control of retransmission is left to an end-to-end (host application) operation.

In either case, MS 102 decides that contention occurs when it detects once or continuously a predetermined number of times that there is no response at the application level when the retransmission procedure is not supported or that there is no ACK response when the retransmission procedure is supported, and MS 102 performs CID selection again.

In this manner, in the first embodiment, in BS 101, one or more burst profiles and one or more CIDs that can be used for an emergency call are defined by emergency call burst profile creation part 101-4 without a bandwidth allocation request from MS 102, and the one or more CIDs and the one or more burst profiles are broadcast in the UL-MAP message. Then, in MS 102, an emergency call CID is randomly selected by MS connection management part 102-2 and CID determination part 102-3.

As described above, in the first embodiment, message exchange for call establishment using a basic CID is omitted between BS 101 and MS 102, so that the basic CID allocation operation in BS 101 is unnecessary, and the initial ranging procedure can be omitted.

Also, by omitting the basic capability procedure, BS 101 cannot obtain information on what function is supported by MS 102, but in the first embodiment, there is no problem if BS-MS exchange is performed, fixedly using only functions that should be necessarily provided as the WiMAX standard.

In the first embodiment, the authentication/encryption procedure can be omitted by not carrying out authentication and encryption for an emergency call.

In the first embodiment, BS 101 does not perform the management of which MS 102 is connected to BS 101 for an emergency call, so that the management of MSs 102 by the registration procedure is also unnecessary.

Also, in the first embodiment, a transport CID is randomly selected in MS 102, so that the transport connection establishment procedure is also unnecessary. In this case, BS connection management part 101-2 fixedly has service flow parameters corresponding to each CID, and the service flow parameters are uniquely determined when the CID is determined.

Further, emergency call bandwidth allocation is uniquely determined corresponding to each CID by BS connection management part 101-2, so that the bandwidth allocation procedure can also be omitted.

In the above manner, the initial ranging procedure, basic capability procedure, authentication/encryption procedure, registration procedure, transport connection establishment procedure, and bandwidth allocation procedure that are necessary in the WiMAX standard can be omitted.

FIG. 5A is a diagram showing a measured value of time for a conventional transport connection establishment procedure. FIG. 5B is a diagram showing a measured value of time for a conventional bandwidth allocation procedure. As seen from these diagrams, in the first embodiment, the time for emergency call establishment can be reduced by 105 ms by omitting the transport connection establishment procedure and the bandwidth allocation procedure. 105 ms is, for example, the time during which a car running at a speed of 90 km/h moves 2.6 m, and is effective as time reduction for conveying emergency information.

Also, the measured values shown in FIGS. 5A and 5B are the shortest measured values when there is one MS 102, so that when there are a plurality of MSs 102, time for the transport connection establishment procedure and the bandwidth allocation procedure is several times longer, therefore, in such a case, the first embodiment can provide greater effect.

Also, as a whole, a time reduction of 40 frames (200 ms) or more can be expected, when each procedure is converted to 10 frames, by omitting the initial ranging procedure, the basic capability procedure, the authentication/encryption procedure, and the registration procedure.

Second Embodiment

The configuration of a second embodiment is similar to that of the first embodiment shown in FIG. 1.

Figure 6:
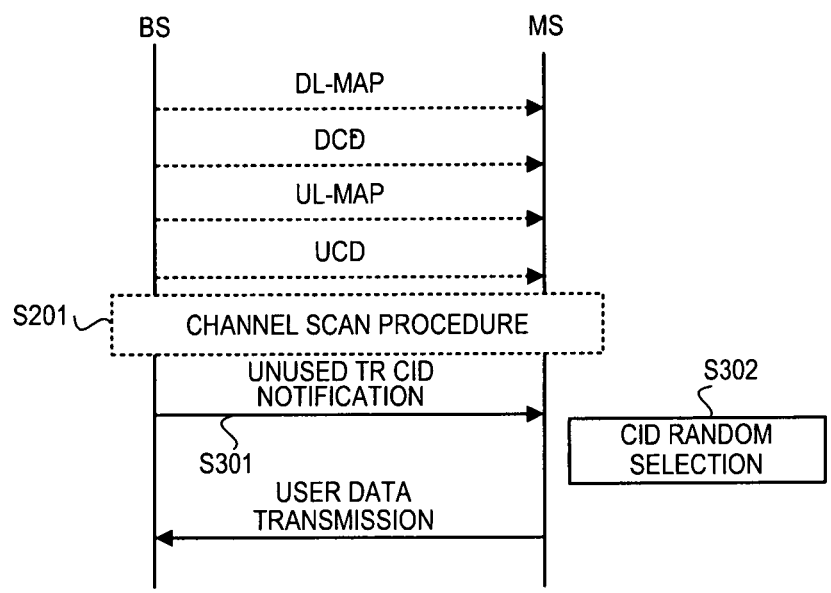
FIG. 6 is an operation sequence diagram of the second embodiment.

FIG. 6 is an operation sequence diagram of the second embodiment. Operation S201 in FIG. 6 is similar to that in FIG. 2.

In the second embodiment, when emergency call burst profile creation part 101-4 and BS connection management part 101-2 in FIG. 1 broadcast one or more emergency call CIDs and one or more burst profiles in a UL-MAP message, they simultaneously notify one or more currently unused CIDs by referring to CID-DB 101-3 (operation S301 in FIG. 6).

BS connection management part 101-2 detects CIDs used from the received uplink (UL) frame and registers the CIDs used in CID-DB 101-3. FIG. 7 is a diagram showing an example of the registration of CID-DB 101-3. BS connection management part 101-2 broadcasts one or more unused CIDs (0x07D4 and 0x07D5 in the example in FIG. 7) to the MS 102 side by referring to this registration content.

BS connection management part 101-2 determines used/unused CIDs, for example, by determining whether each CID is used or not in the immediately preceding one frame or continuous frames.

MS connection management part 102-2 allows CID determination part 102-3 to randomly select a CID to be used from among one or more CIDs that are described in the UL-MAP message and unused (operation S302 in FIG. 6).

FIG. 8 is a diagram showing the data format of the UL-MAP message (UL_MAP_IE) in the second embodiment.

Also in the second embodiment, the UL-MAP format that is defined as the WiMAX standard is utilized as it is, as in the first embodiment (FIG. 4). In this case, an undefined part in the UL-MAP that is prepared for extension is used. In the second embodiment, the UIUC of emergency call CID is set to 11 in FIG. 8. When this UIUC is 11, the status of use of CID (CID status) is written in an UL_Extended-2 IE( ) area that is prepared for extension. When the CID is unused, the value of CID status is set to 0x00. When the CID is in use, the value of CID status is set to 0x01.

By the configuration of the second embodiment as described above, MS 102 can randomly select a CID from among one or more currently unused CIDs, so that CID collision by a plurality of MSs 102 can be avoided.

Third Embodiment

Figure 9:
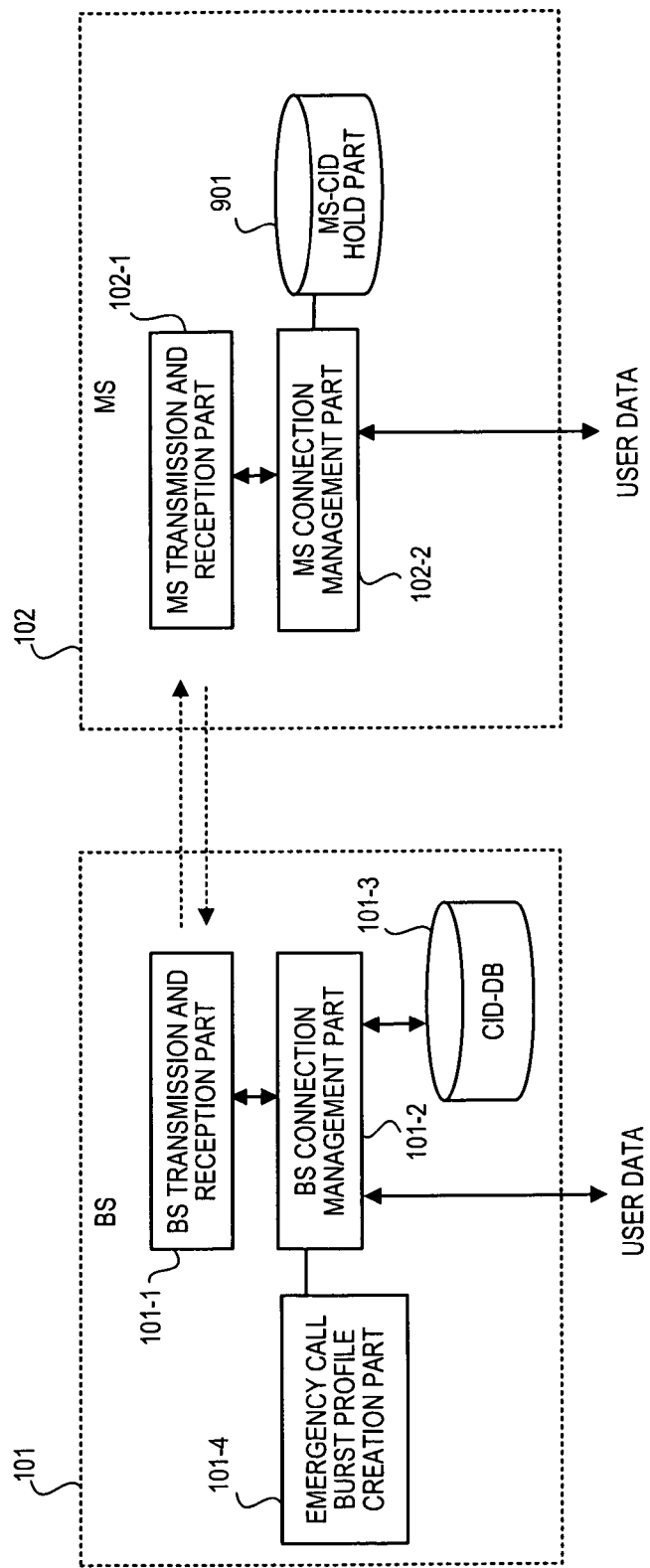
FIG. 9 is a configuration diagram of a third embodiment.

FIG. 9 is a configuration diagram of a third embodiment. Parts denoted by the same numerals as in the configuration diagram of the first embodiment shown in FIG. 1 have the same function as in the first embodiment.

In the third embodiment, in MS 102, an emergency call CID it uses is previously fixedly held in mobile station CID hold part (hereinafter referred to as "MS-CID hold part") 901. MS connection management part 102-2 sees a UL-MAP message that is broadcast as in the first embodiment, and transmits an uplink burst at a burst position corresponding to its CID.

By the configuration of the third embodiment as described above, the possibility of CID contention when a plurality of MSs 102 exist can be avoided, and also, it is possible to omit the function of randomly selecting a CID to simplify the apparatus.

Fourth Embodiment

This embodiment shows an example of operation when an MS is mounted in a vehicle and the vehicle passes through a plurality of adjacent service areas, based on any of the above-described first to third embodiments.

Figure 10:
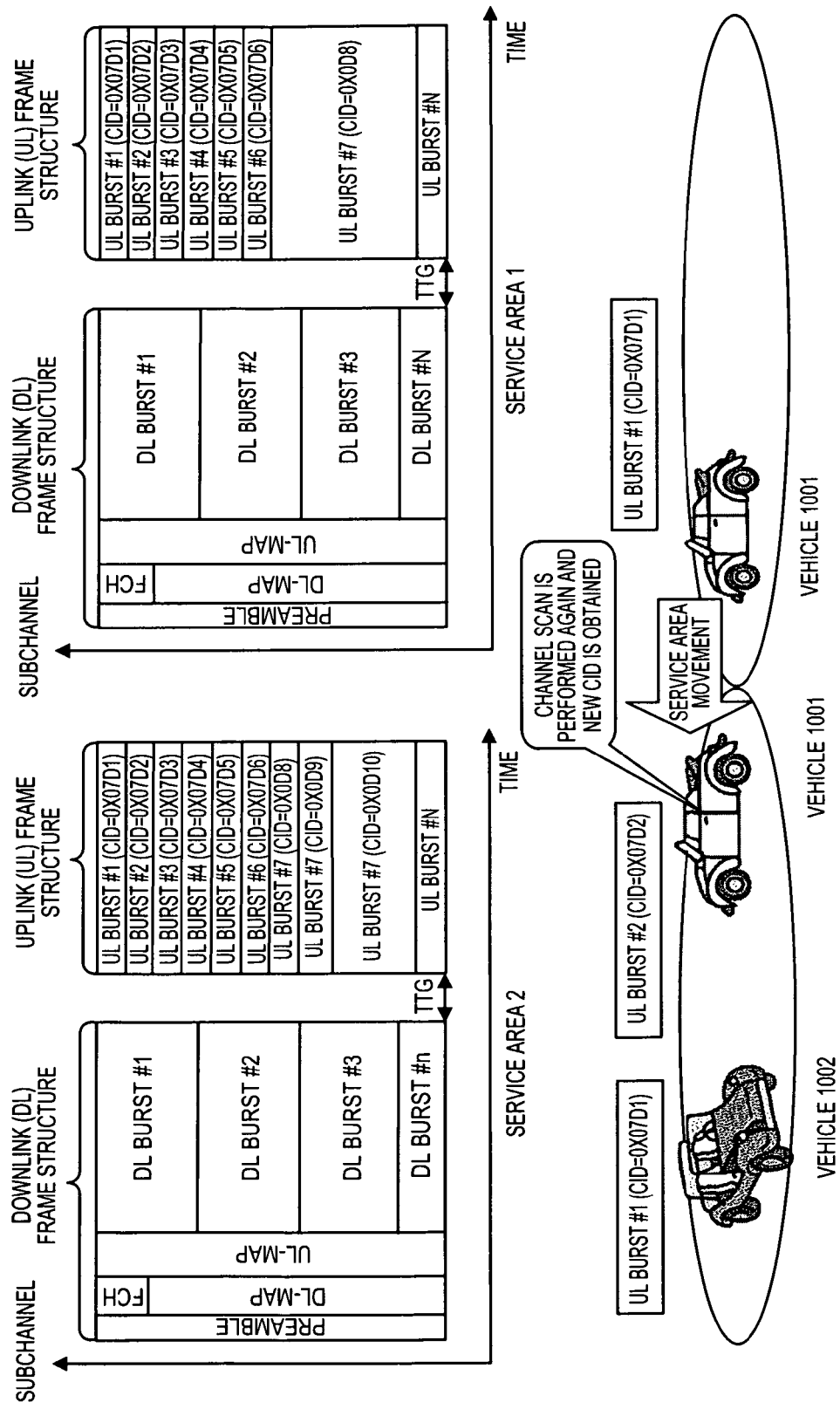
FIG. 10 is a diagram explaining the operation of the fourth embodiment (1)

FIG. 10 is a diagram explaining the operation of the fourth embodiment (1).

In this example, when vehicle 1001 in service area 1 moves and enters service area 2, vehicle 1001 performs channel scan again and obtains a CID because in service area 2, a UL-MAP message corresponding to the burst profiles of the area is broadcast.

Figure 11:
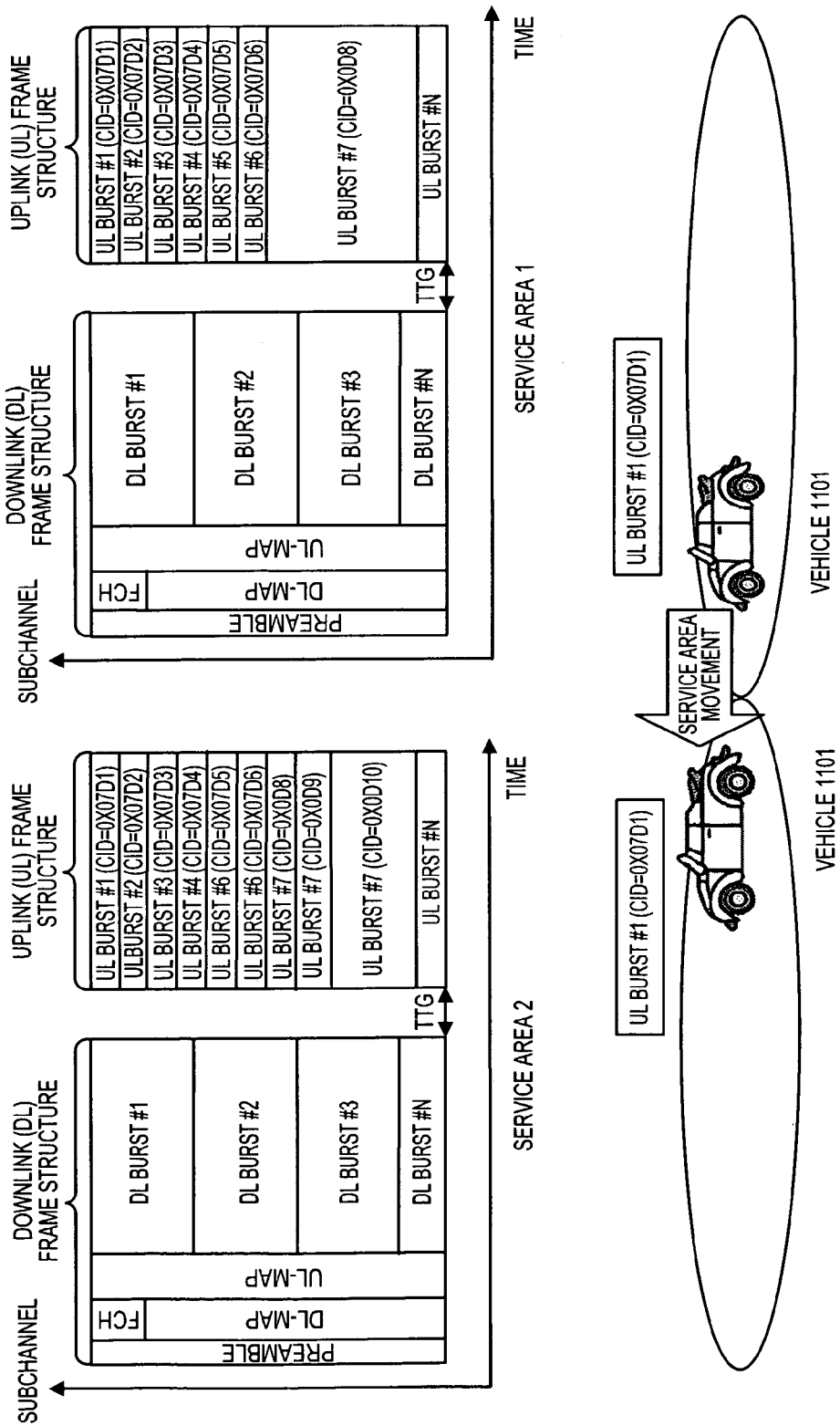
FIG. 11 is a diagram explaining the operation of the fourth embodiment (2)

FIG. 11 is a diagram explaining the operation of the fourth embodiment (2).

In this example, an emergency call burst position and CID are common to each cell, and this example is configured so that they can be continuously used when there is no user in a cell into which vehicle 1101 moves.

Fifth Embodiment

Figure 12:
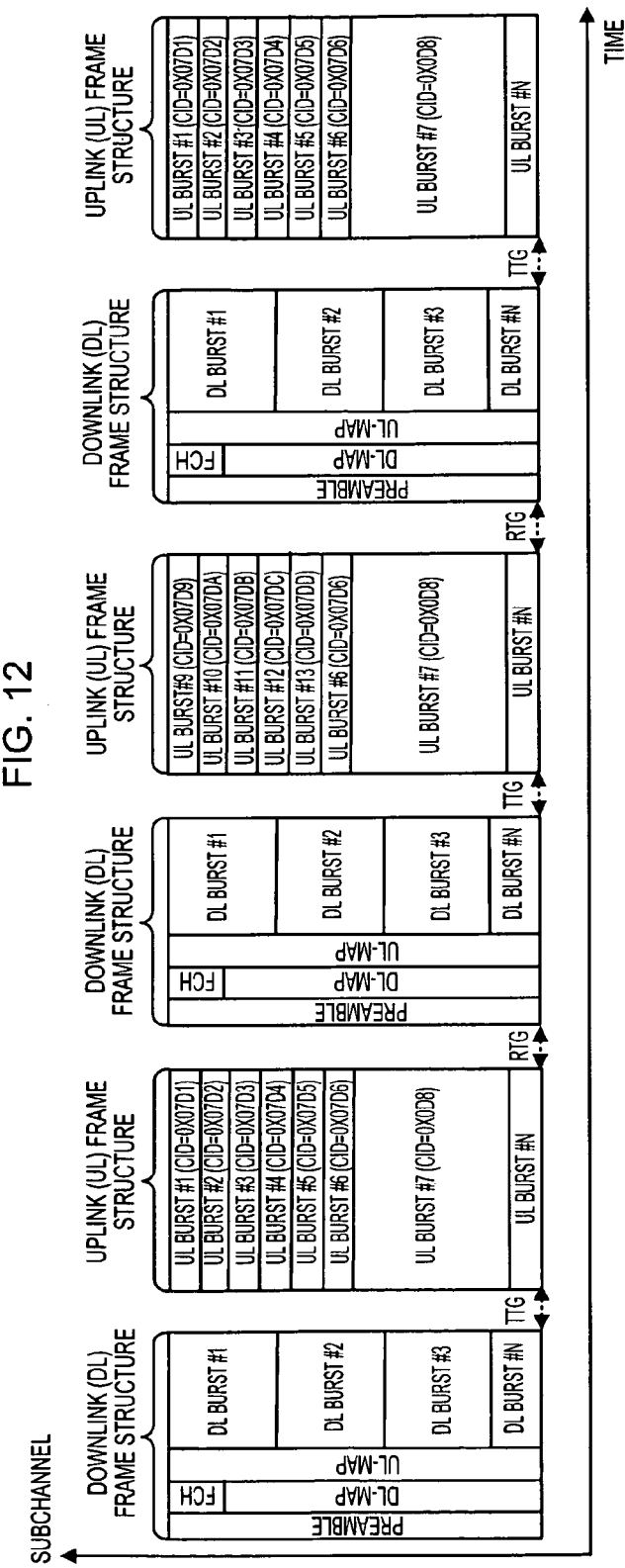
FIG. 12 is a diagram explaining the operation of the fifth embodiment.
Figure 14:
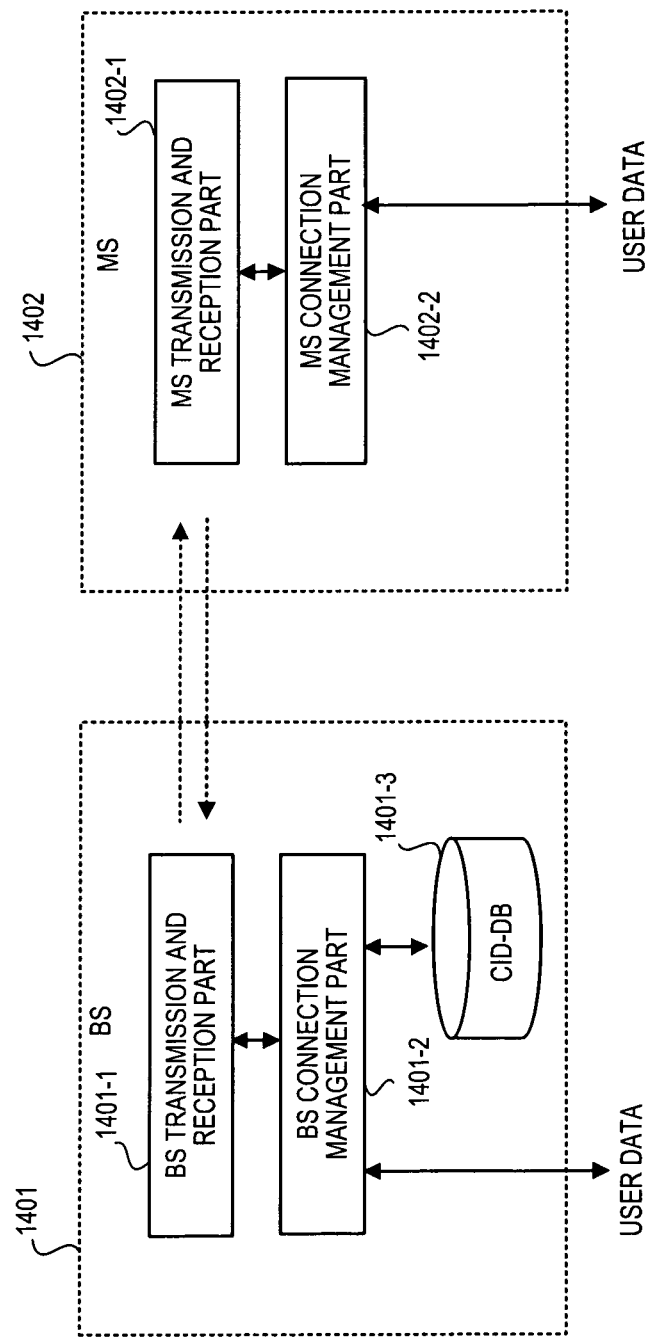
FIG. 14 is a configuration diagram of the related art.
Figure 15:
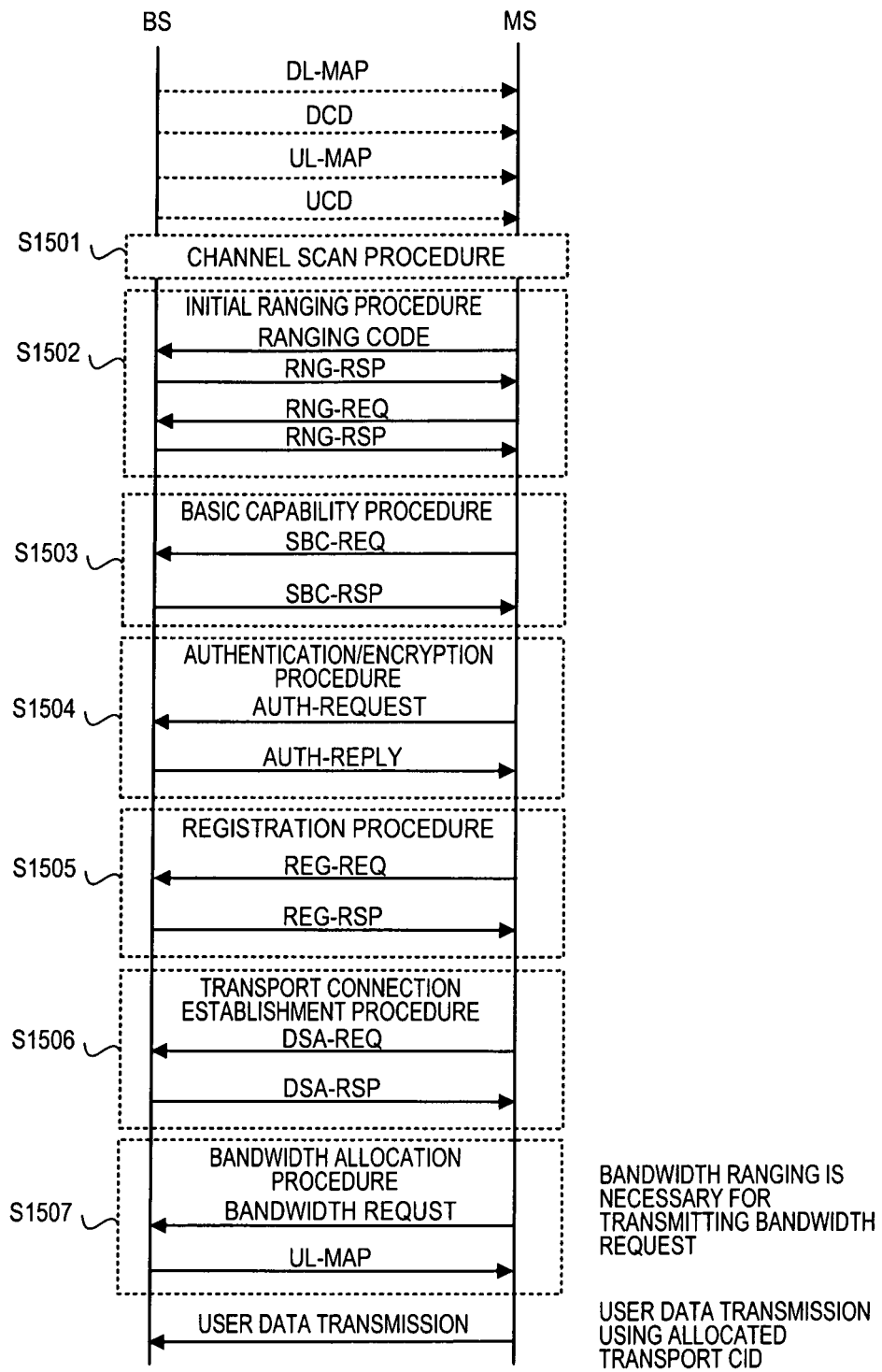
FIG. 15 is an operation sequence diagram of the related art.

In this embodiment, emergency call bursts are allocated once per two frames, as shown in FIG. 12, to increase the number of emergency calls, based on any of the above-described first to third embodiments.

In this case, an MS can transmit per 10 ms (5 ms for allocation once per frame) so that the transmission is slow, but there is a merit that the number of MSs can be increased.

In order to notify to the MS side whether emergency call bursts are sent once per a plurality of frames or sent per frame, for example, in a UL-MAP message format shown in FIG. 13 as in FIG. 8, period information ("period" and the like) should be added to UL_Extended-2_IE( ).

By the above-described embodiments, procedures for establishing a call, such as an initial ranging procedure, basic capability procedure, authentication/encryption procedure, registration procedure, transport connection establishment procedure, and bandwidth allocation procedure, which are necessary in the WiMAX standard, can be omitted, so that time necessary for the establishment of a specific call, such as an emergency call, can be reduced.

Also, a mobile station can randomly select a connection identifier from among one or more currently unused connection identifiers, so that connection identifier collision by a plurality of mobile stations can be avoided.

Also, by the above-described embodiments, the possibility of connection identifier contention when a plurality of mobile stations exist can be avoided, and also, it is possible to omit the function of randomly selecting a connection identifier to simplify the apparatus.

Also, by enabling to randomly allocate a transport CID within an MS, sequence message exchange can be omitted, and the MS can transmit and receive user data immediately after channel search Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method for allocating a connection identifier in a wireless communication system, the method comprising:
defining one or more connection identifiers that can be used for a specific call communication between a base station and a mobile station and one or more burst profiles that are attributes related to wireless communication using the one or more connection identifiers, in the base station;

broadcasting the one or more connection identifiers that can be used for the specific call communication and the one or more burst profiles, or one or more unused connection identifiers among the one or more connection identifiers used for the specific call communication and one or more burst profiles corresponding to the one or more unused connection identifiers, from the base station to the mobile station; and selecting, by the mobile station, a connection identifier and a burst profile from the one or more connection identifiers and one or more burst profiles that are broadcast for allocation for the specific call communication, wherein emergency call connection identifiers of the one or more connection identifiers are greater than a predetermined number, and wherein the mobile station can determine a transport connection identifier randomly.

2. A method for allocating a connection identifier in a wireless communication system, the method comprising:

defining one or more connection identifiers that can be used for a specific call communication between a base station and a mobile station and one or more burst profiles that are attributes related to wireless communication using the one or more connection identifiers, in the base station;

broadcasting the one or more connection identifiers that can be used for the specific call communication and the one or more burst profiles from the base station to the mobile station;

allocating to the mobile station a connection identifier that is used for the specific call communication by the mobile station; and allocating for the specific call communication a burst position corresponding to the connection identifier that is previously allocated to the mobile station, based on the one or more connection identifiers and one or more burst profiles that are broadcast, in the mobile station, wherein emergency call connection identifiers of the one or more connection identifiers are greater than a predetermined number, and wherein the mobile station can determine a transport connection identifier randomly.

3. An apparatus for allocating one or more connection identifiers in a base station of a wireless communication system, the apparatus comprising:

a processor configured to define one or more connection identifiers that can be used for a specific call communication between a base station and a mobile station and one or more burst profiles that are attributes related to wireless communication using the one or more connection identifiers; and a transmitter configured to broadcast the one or more connection identifiers that can be used for the specific call communication and the one or more burst profiles to the mobile station, the one or more connection identifiers being allocated to the mobile station by the mobile station, wherein emergency call connection identifiers of the one or more connection identifiers are greater than a predetermined number, and wherein the mobile station can determine a transport connection identifier randomly.

* * * * *